United States Patent
Bryant, Jr.

(10) Patent No.: US 11,454,121 B2
(45) Date of Patent: Sep. 27, 2022

(54) AIRFOIL WITH LEADING EDGE GUARD

(71) Applicant: General Electric Company, Schenectady, NY (US)

(72) Inventor: Gary Williard Bryant, Jr., Loveland, OH (US)

(73) Assignee: General Electric Company, Schenectady, NY (US)

(*) Notice: Subject to any disclaimer, the term of this patent is extended or adjusted under 35 U.S.C. 154(b) by 58 days.

(21) Appl. No.: 16/146,623

(22) Filed: Sep. 28, 2018

(65) Prior Publication Data

US 2020/0102835 A1   Apr. 2, 2020

(51) Int. Cl.
*F01D 5/14*   (2006.01)
*F01D 5/28*   (2006.01)

(52) U.S. Cl.
CPC ............. *F01D 5/147* (2013.01); *F01D 5/28* (2013.01); *F05D 2220/32* (2013.01); *F05D 2230/23* (2013.01); *F05D 2230/30* (2013.01); *F05D 2230/80* (2013.01); *F05D 2240/303* (2013.01); *F05D 2250/71* (2013.01); *F05D 2300/17* (2013.01)

(58) Field of Classification Search
CPC ........ F01D 5/147; F01D 5/28; F05D 2220/32; F05D 2230/23; F05D 2230/30; F05D 2230/80; F05D 2240/303; F05D 2250/71; F05D 2300/17
See application file for complete search history.

(56) References Cited

U.S. PATENT DOCUMENTS

| | | | |
|---|---|---|---|
| 2,637,405 A | 5/1953 | Stanley | |
| 2,990,309 A | 6/1961 | Wahl et al. | |
| 3,369,782 A | 2/1968 | Billig et al. | |
| 3,476,625 A | 11/1969 | Slivinsky et al. | |
| 4,329,119 A | 5/1982 | Baskin | |
| 4,786,015 A | 11/1988 | Niggemann | |
| 6,050,523 A | 4/2000 | Kraenzien | |
| 6,655,633 B1 | 12/2003 | Chapman, Jr. | |
| 7,063,763 B2 | 6/2006 | Chapman, Jr. | |
| 2010/0054945 A1* | 3/2010 | McMillan | F01D 5/282 416/223 A |
| 2010/0148006 A1* | 6/2010 | Olmi | B64C 3/28 244/121 |
| 2013/0082142 A1* | 4/2013 | Li | B64C 5/06 244/123.1 |
| 2013/0111908 A1* | 5/2013 | Murooka | F01D 5/28 60/726 |
| 2013/0251536 A1 | 9/2013 | Mironets et al. | |
| 2014/0030105 A1 | 1/2014 | Fameau et al. | |
| 2014/0133987 A1* | 5/2014 | Guinaldo Fernandez | F01D 5/14 416/131 |

(Continued)

FOREIGN PATENT DOCUMENTS

GB   2062120 A   5/1981

*Primary Examiner* — Woody A Lee, Jr.
*Assistant Examiner* — Eric A Lange
(74) *Attorney, Agent, or Firm* — Dority & Manning, P.A.

(57) ABSTRACT

An edge guard apparatus for an airfoil includes: a body having a nose section with spaced-apart first and second sidewalls extending therefrom, the body defining a cavity between the first and second sidewalls; and internal bracing disposed in the cavity, the internal bracing including at least one cross-member extending between the first and second sidewalls.

19 Claims, 4 Drawing Sheets

(56) References Cited

U.S. PATENT DOCUMENTS

| | | |
|---|---|---|
| 2015/0086378 A1 | 3/2015 | Klein et al. |
| 2015/0104323 A1 | 4/2015 | Franchet et al. |
| 2015/0298787 A1* | 10/2015 | Nordin ................ B64C 3/28 244/45 R |
| 2018/0045216 A1* | 2/2018 | Karlen ................ F04D 29/388 |

* cited by examiner

AIRFOIL WITH LEADING EDGE GUARD

BACKGROUND OF THE INVENTION

This invention relates generally to airfoil protective leading edge guards and in particular to fan blade leading edge guards.

Fan blades and other structures used in turbine engine applications are susceptible to foreign object impact damage, for example during bird ingestion events. Blades made of composite materials such as graphite fiber reinforced epoxy are attractive due to their high overall specific strength and stiffness. However, graphite composites are particularly prone to brittle fracture and delamination during foreign object impacts due to their low ductility. Blade leading edges, trailing edges, and tips are particularly sensitive because of the generally lower thickness in these areas and the well-known susceptibility of laminated composites to free edge delamination. In addition, blade geometry and high rotational speeds relative to aircraft speeds cause ingested objects to strike the blade near the leading edge.

Metallic guards bonded to the leading edges of composite fan blades are known to provide impact damage protection.

One problem with prior art leading edge guards is that they are generally made of high-density alloys and usually include a completely solid nose section to provide adequate impact protection. This undesirably increases their weight.

BRIEF SUMMARY OF THE INVENTION

The above-noted problem is addressed by an airfoil incorporating an edge guard with a hollow cavity having internal bracing.

According to one aspect of the technology described herein, an edge guard apparatus for an airfoil includes: a body having a nose section with spaced-apart first and second sidewalls extending therefrom, the body defining a cavity between the first and second sidewalls; and internal bracing disposed in the cavity, the internal bracing including at least one cross-member extending between the first and second sidewalls.

According to another aspect of the technology described herein, an airfoil apparatus includes: an airfoil having convex and concave sides extending between a leading edge and a trailing edge; an edge guard apparatus attached to the airfoil, comprising: a body having a nose section abutting the leading edge of the airfoil and spaced-apart first and second sidewalls extending therefrom along the sides of the airfoil, the body defining a cavity between the first and second sidewalls; and internal bracing disposed in the cavity, the internal bracing including at least one cross-member extending between the first and second sidewalls.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
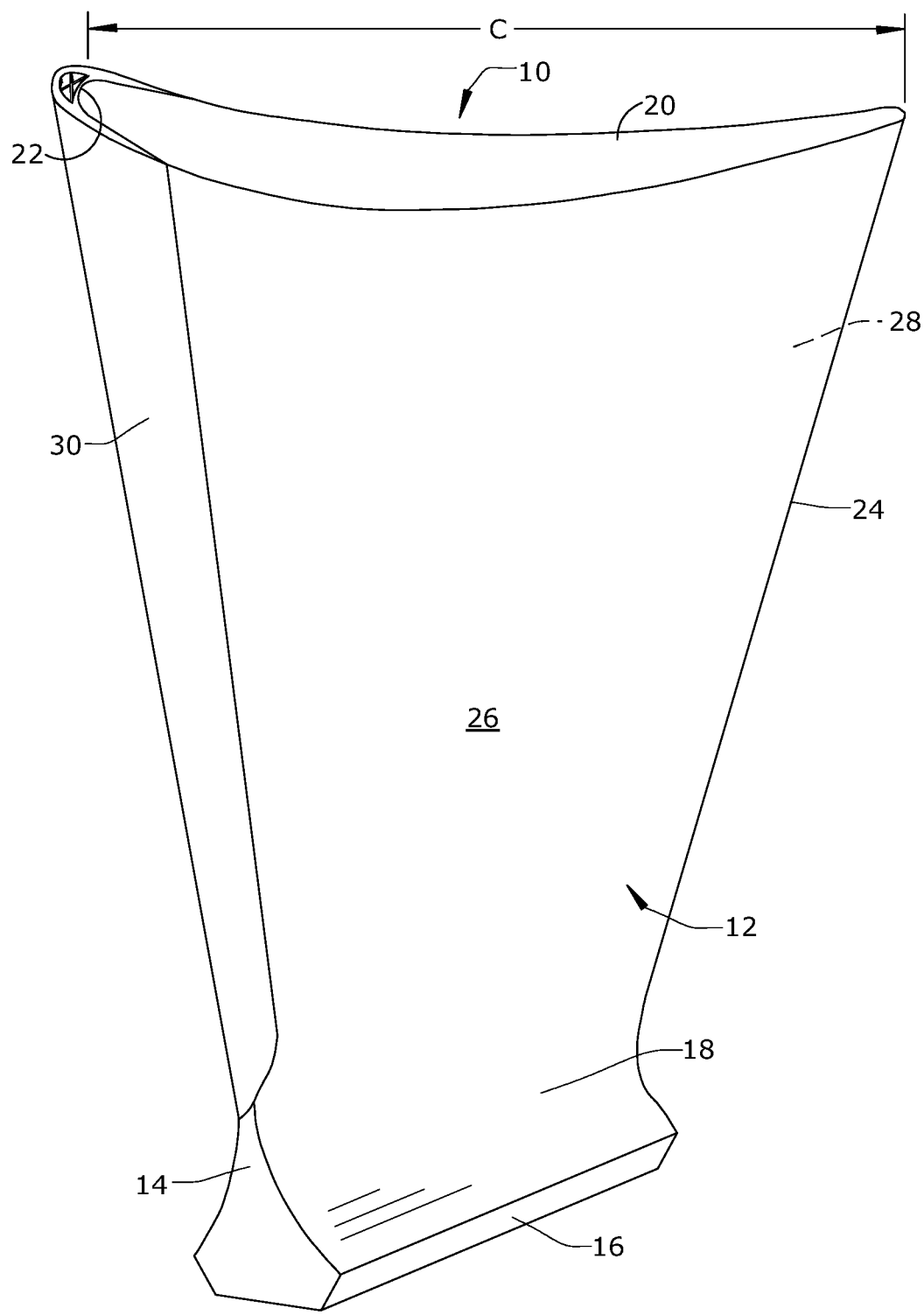
FIG. 1 is a view of a gas turbine engine fan blade incorporating an exemplary leading edge guard.

Referring to the drawings wherein identical reference numerals denote the same elements throughout the various views, FIG. 1 depicts an exemplary fan blade 10 for a gas turbine engine. The fan blade 10 includes an airfoil 12, shank 14, and dovetail 16. The airfoil 12 extends in chord between a root 18 and a tip 20, and has a leading edge 22 and a trailing edge 24. Opposed convex and concave sides 26 and 28, respectively, extend in chord between the leading edge 22 and the trailing edge 24. The fan blade 10 is merely an example; the principles of the present invention are applicable to other kinds of structures requiring impact protection.

The fan blade 10 may be made from one or more metal alloys, or from a nonmetallic material, such as a composite system with an epoxy matrix and carbon fiber reinforcement.

The airfoil 12 has a leading edge guard 30 attached to the leading edge 22. The leading edge guard 30 helps provide the fan blade 10 with additional impact resistance, erosion resistance and improved resistance of the composite structure to delamination. In particular, the leading edge guard 30 has internal bracing.

Figure 2:
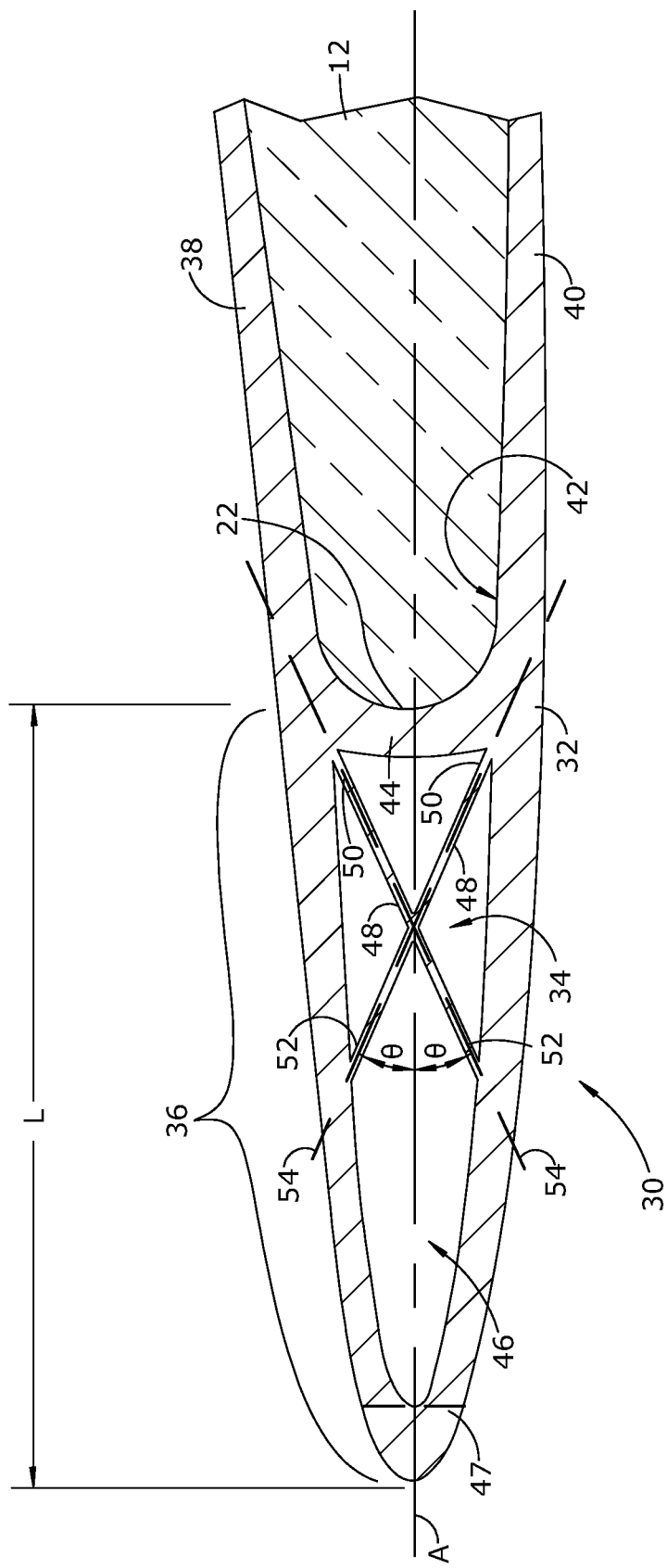
FIG. 2 is a cross-sectional view of a portion of the fan blade of FIG. 1.

As best seen in FIG. 2, the leading edge guard 30 comprises a body 32 with internal bracing 34. The body 32 includes a nose section 36 with a pair of sidewalls 38 and 40 extending aft therefrom. The overall length "L" of the nose section 36 would generally be some small fraction of the overall chord length "C" of the airfoil 12. As an example, the dimension L may be approximately 0.1% to approximately 10% of the chord length C.

The sidewalls 38 and 40 generally taper in thickness as they extend away from the nose section 36 to their terminal ends. Consistent with prior art practices, the sidewalls 38 and 40 may include various combinations of tapered and constant-thickness portions along their length. Exterior surfaces of the nose section 36 and sidewalls 38 and 40 collectively define an exterior surface of the body 32. The shape and dimensions of the exterior surface are selected to act as an aerodynamic extension of the airfoil 12. The body 32 may be attached to the airfoil 12 with a known type of adhesive.

Interior surfaces of the nose section 36 and sidewalls 38 and 40 collectively define an interior surface 42 of the body 32. The shape and dimensions of the interior surface 42 are selected to closely fit the exterior of the airfoil 12.

The nose section 36 has a hollow interior space (i.e. a cavity) 46 defined therein, leaving a solid nose portion 47 disposed at the forward end of the nose section 36. A bulkhead 44 extends between the sidewalls 38 and 40 at the aft end of the nose section 36 and abuts the leading edge 22 of the airfoil 12. The cavity 46 is thus bounded by the bulkhead 44, interior surfaces of the sidewalls 36, 38, and the solid nose portion 47. The cavity 46 represents a mass reduction compared to a prior art leading edge guard 30 of similar overall dimensions. As an example, the cross-sectional area of the solid nose portion 47 may be from approximately 20% to approximately 90% of the total cross-sectional area of the nose section 36.

The body 32 may be made from a metal alloy of the desired composition. One non-limiting example of an alloy suitable for construction of the body 32 is a nickel-based alloy commercially available as INCONEL 718 or IN718.

The internal bracing 34 is disposed in the cavity 46. Generally, "bracing" refers to a structure configured to increase the structural strength of the body 32 and confer increased resistance to impact force.

In the illustrated example, the bracing 34 comprises a plurality of cross-members 48 disposed in the cavity 46, Each cross-member 48 extends from one sidewall 38 to the other sidewall 38. In this embodiment, each cross-member 48 has a first end 50 disposed at the bulkhead 44 and a second end 52 disposed axially forward of the bulkhead 44.

Viewed in the plane of the airfoil cross-section, the long axes 54 of the cross-members 48 run at an angle θ to an axial direction "A" of the airfoil 12. The exact orientations of the cross-members 48 may be determined analytically or empirically, for example using conventional finite element analysis software. In one example, the cross-members 48 may be oriented so that their long axes 54 are parallel to a predicted direction of impact of a foreign object such as a bird. In one example, the angle θ may be an oblique angle.

In the illustrated example, a first group of the cross-members 48 extend in one orientation and a second group of the cross-members 48 extend in a second orientation which is generally mirrored about axial direction A, such that the cross-members 48 define an "X" shape. Other configurations are possible, for example the cross-members 48 could by arranged to form a "V" or "Y" shape.

The cross-members 48 may be of varying cross-sectional shapes and sizes to provide a preferred combination of impact resistant capability and low weight. The cross-members 48 may be configured as a plurality of discrete elements located at incremental spanwise sections of the body 32, or they may extend continuously over all or a portion of the spanwise direction of the body 32 (i.e. into the page in FIG. 2). The cross-member may be in the form of a bar or a plate.

It will be understood that the airfoil 12 may incorporate features such as "twist", i.e. successive airfoil sections rotated relative to each other, or "bow", i.e. a non-linear airfoil stacking axis. The angle θ may change as necessary along the airfoil span to follow the path of any non-linear shaping of the airfoil 12.

Furthermore, the configuration of cross-members 48 may vary over the span of the airfoil 12. For example, an inboard portion of the airfoil 12 may include fewer or relatively smaller cross-members 48, while an outboard portion of the airfoil 12 includes greater or relatively larger cross-members 48. This is consistent with the principle that the outboard portion of the airfoil 12 operates at a greater velocity than the inboard portion (for a given rotor speed) and therefore experiences greater kinetic energy input in the event of impact. Selectively placing a larger amount of bracing where most needed provides impact protection in an efficient manner.

The cross-members 48 may be made from various materials, such as metal alloys, polymers, ceramics, or composites of those materials. A non-limiting example of an alloy suitable for construction of the cross-members 48 is a nickel-based alloy commercially available as INCONEL 718 or IN718.

All or part of the body 32 and/or bracing 34 may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being the term used herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLS), Electron Beam Melting (EBM), Laser Engineered Net Shaping (LENS), and Direct Metal Deposition (DMD).

Figure 3:
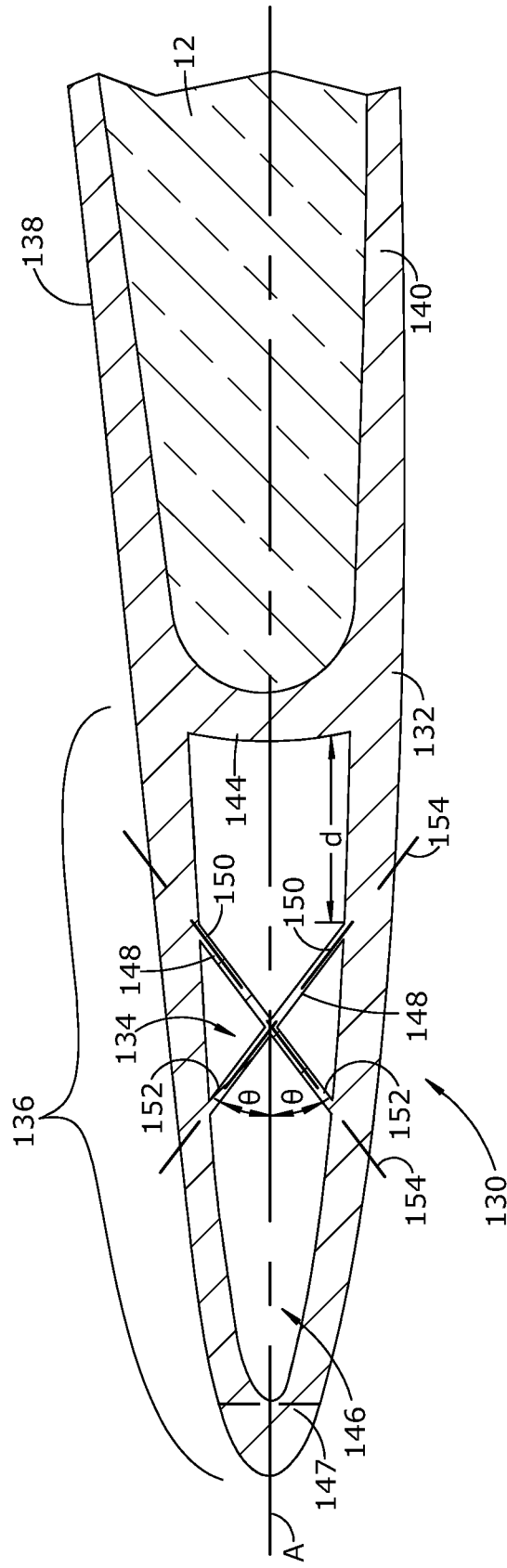
FIG. 3 is a cross-sectional view of an alternative leading edge guard.

FIG. 3 illustrates an alternative embodiment of a leading edge guard 130 attached to an airfoil 12. The leading edge guard 130 is similar in construction to the leading edge guard 30 described above. Elements of the leading edge guard 130 not specifically described may be considered to be identical to those of the leading edge guard 30. The leading edge guard 130 comprises a body 132 with a nose section 136, sidewalls 138, 140, a bulkhead 144, and a solid nose portion 147, collectively defining internal cavity 146. Internal bracing 134 is disposed inside the cavity 146.

In the illustrated example, the bracing 34 comprises a plurality of cross-members 148 disposed in the cavity 146. Each cross-member 148 extends from one sidewall 138 to the other sidewall 140. In this embodiment, each cross-member 148 has a first end 150 disposed axially forward of the bulkhead 144, as indicated by distance "d", and a second end 152 disposed axially forward of the bulkhead first end 150.

Viewed in the plane of the airfoil cross-section, the long axes 154 of the cross-members 148 run at an angle θ to an axial direction "A" of the airfoil 12. The angle θ may be selected as described above for the cross-members 48.

In the illustrated example, a first group of the cross-members 148 extend in one orientation and a second group of the cross-members 148 extend in a second orientation which is generally mirrored about axial direction A, such that the cross-members 48 define an "X" shape. Variations on the dimensions, numbers, orientation, and spanwise configuration of the cross-members 148 may be implemented as described above for cross-members 48.

Figure 4:
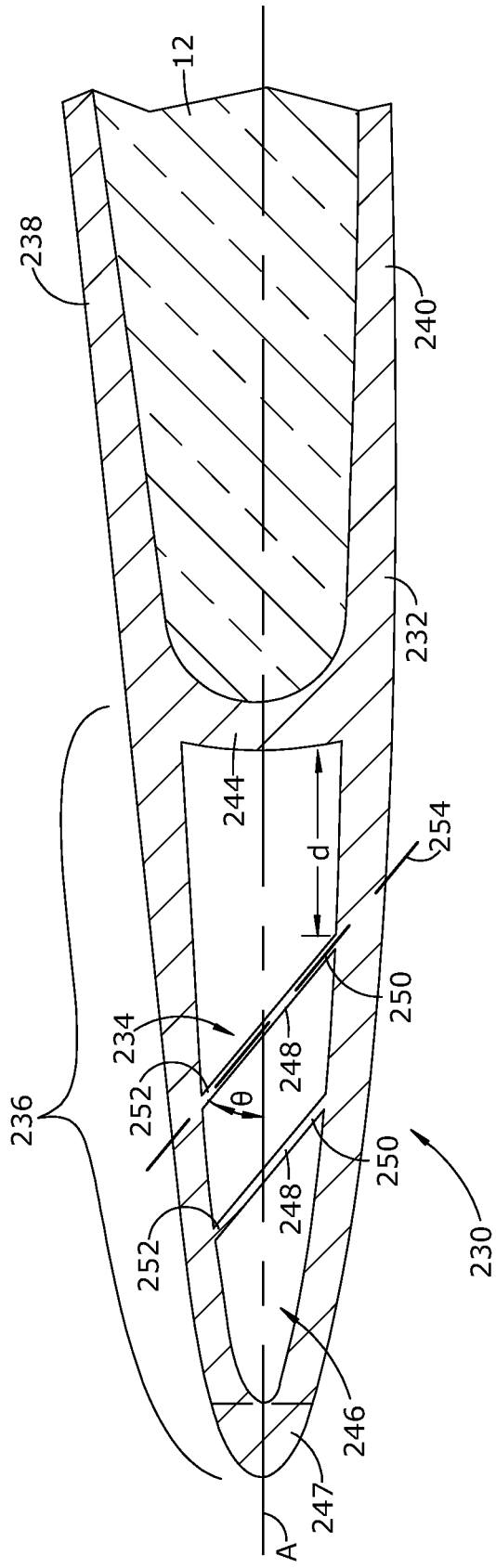
FIG. 4 is a cross-sectional view of another alternative leading edge guard.

FIG. 4 illustrates another alternative embodiment of a leading edge guard 230 attached to an airfoil 12. The leading edge guard 230 is similar in construction to the leading edge guard 30 described above. Elements of the leading edge guard 230 not specifically described may be considered to be identical to those of the leading edge guard 30. The leading edge guard 230 comprises a body 232 with a nose section 236, sidewalls 238, 240, a bulkhead 244, and a solid nose portion 247, collectively defining internal cavity 246. Internal bracing 234 is disposed inside the cavity 246.

In the illustrated example, the bracing 234 comprises a plurality of cross-members 248 disposed in the cavity 246. Each cross-member 248 extends from one sidewall 238 to the other sidewall 240. In this embodiment, each cross-member 248 has a first end 250 disposed axially forward of the bulkhead 244, as indicated by distance "d", and a second end 252 disposed axially forward of the bulkhead first end 250.

Viewed in the plane of the airfoil cross-section, the long axes 254 of the cross-members 248 run at an angle θ to an axial direction "A" of the airfoil 12. The angle θ may be selected as described above for the he cross-members 48.

In the illustrated example, all of the cross-members 248 extend in one orientation, defining an array of spaced-apart parallel elements. Variations on the dimensions, numbers, orientation, and spanwise configuration of the cross-members 248 may be implemented as described above for cross-members 48.

The apparatus described herein has several advantages over prior art leading edge guards. It uses a hollow interior for reduced weight, combined with an internal bracing structure for added stiffness and increased impact capability.

The foregoing has described an airfoil with a leading edge guard. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An edge guard apparatus for an airfoil, comprising:
   a body having a nose section, the nose section having a solid nose portion at a forward end thereof, a bulkhead at an aft end thereof, the bulkhead abutting a leading edge of the airfoil, and spaced-apart first and second sidewalls extending from the solid nose portion, the nose section defining a cavity forward of the bulkhead and between the first and second sidewalls, wherein the solid nose portion has a cross-sectional area which is 20% to 90% of a cross-sectional area of the nose section; and
   internal bracing disposed in the cavity, the internal bracing including at least one cross-member extending from the first sidewall to the second sidewall at an oblique angle to an axial direction of the body,
   wherein the body and the internal bracing are part of a monolithic whole, and
   wherein the at least one cross-member varies in at least one of size or shape across a spanwise direction of the body.

2. The apparatus of claim 1 wherein at least one cross-member has a first end disposed at the bulkhead and a second end disposed axially forward of the bulkhead.

3. The apparatus of claim 1 wherein at least one cross-member has a first end disposed axially forward of the bulkhead and a second end disposed axially forward of the first end.

4. The apparatus of claim 1 wherein the internal bracing comprises a plurality of cross-members.

5. The apparatus of claim 4, wherein the plurality of cross-members further varies in number across a spanwise direction of the body.

6. The apparatus of claim 1, wherein the nose section defines a length and the airfoil defines a chord length, and wherein the length is approximately 0.1% to approximately 10% of the chord length.

7. The apparatus of claim 1, wherein an inboard portion of the airfoil comprises a fewer number of the at least one cross-members, and wherein an outboard portion of the airfoil includes a greater number of the at least one cross-members.

8. The apparatus of claim 1, wherein the at least one cross-members are smaller in an inboard portion of the airfoil, and wherein the at least one cross-members are larger in an outboard portion of the airfoil.

9. An edge guard apparatus attached to an airfoil, comprising:
   a body having a nose section, the nose section having a solid nose portion at a forward end thereof, a bulkhead at an aft end thereof, the bulkhead abutting a leading edge of the airfoil, and spaced-apart first and second sidewalls extending from the solid nose portion, the nose section defining a cavity forward of the bulkhead and between the first and second sidewalls, wherein the solid nose portion has a cross-sectional area which is 20% to 90% of a cross-sectional area of the nose section; and
   internal bracing disposed in the cavity, wherein the internal bracing comprises a plurality of parallel, spaced-apart cross-members extending from the first sidewall to the second sidewall at an angle to an axial direction of the body,
   wherein the body and the internal bracing are part of a monolithic whole, and
   wherein the plurality of parallel, spaced-apart cross-members varies in at least one of size, shape, or number across a spanwise direction of the body.

10. The apparatus of claim 1 wherein the internal bracing comprises a plurality of members arranged to form an X, Y, or V shape.

11. The apparatus of claim 9, wherein the nose section defines a length and the airfoil defines a chord length, and wherein the length is approximately 0.1% to approximately 10% of the chord length.

12. The apparatus of claim 9, wherein an inboard portion of the airfoil comprises a fewer number of the plurality of parallel, spaced-apart cross-members, and wherein an outboard portion of the airfoil includes a greater number of the plurality of parallel, spaced-apart cross-members.

13. The apparatus of claim 9, wherein the plurality of parallel, spaced-apart cross-members is smaller in an inboard portion of the airfoil, and wherein the plurality of parallel, spaced-apart cross-members is larger in an outboard portion of the airfoil.

14. An airfoil apparatus, comprising:
   an airfoil having convex and concave sides extending between a leading edge and a trailing edge;
   an edge guard apparatus attached to the airfoil, comprising:
   a body having a nose section, the nose section having a solid nose portion at a forward end thereof, a bulkhead at an aft end thereof, the bulkhead abutting the leading edge of the airfoil, and spaced-apart first and second sidewalls extending from the solid nose portion along the sides of the airfoil, the nose section defining a cavity forward of the bulkhead and between the first and second sidewalls, wherein the solid nose portion has a cross-sectional area which is 20% to 90% of a cross-sectional area of the nose section; and
   internal bracing disposed in the cavity, the internal bracing including a plurality of members arranged to form an X shape from the first sidewall to the second sidewall,
   wherein the body and the internal bracing are part of a monolithic whole, and
   wherein the plurality of members varies in at least one of size, shape, or number across a spanwise direction of the body.

15. The apparatus of claim 14, wherein at least one of the plurality of members has a first end disposed at the bulkhead and a second end disposed axially forward of the bulkhead.

16. The apparatus of claim 14, wherein at least one of the plurality of members has a first end disposed axially forward of the bulkhead and a second end disposed axially forward of the first end.

17. The apparatus of claim 14, wherein the nose section defines a length and the airfoil defines a chord length, and wherein the length is approximately 0.1% to approximately 10% of the chord length.

18. The apparatus of claim 14, wherein an inboard portion of the airfoil comprises a fewer number of the plurality of members, and wherein an outboard portion of the airfoil includes a greater number of the plurality of members.

19. The apparatus of claim 14, wherein the plurality of members is smaller in an inboard portion of the airfoil, and wherein the plurality of members is larger in an outboard portion of the airfoil.

\* \* \* \* \*